United States Patent [19]
Chamberlin et al.

[11] 3,737,044
[45] June 5, 1973

[54] LIQUID TREATMENT SYSTEM FOR HIGH PH WATER

[75] Inventors: Richard M. Chamberlin, McKeesport; Regis R. Stana, Murrysville, both of Pa.

[73] Assignee: Westinghouse Electric Corporation, Pittsburgh, Pa.

[22] Filed: Apr. 6, 1972

[21] Appl. No.: 241,811

Related U.S. Application Data

[62] Division of Ser. No. 058,788, July 28, 1970, Pat. No. 3,684,094.

[52] U.S. Cl. .................. 210/501, 210/505, 264/165
[51] Int. Cl. .............................................. B01d 39/04
[58] Field of Search ...................... 264/165; 210/501, 210/505

[56] References Cited
UNITED STATES PATENTS

| | | | |
|---|---|---|---|
| 2,528,847 | 11/1950 | Van Norden | 210/501 |
| 2,955,067 | 10/1960 | McBurney et al. | 210/505 |

*Primary Examiner*—Frank A. Spear, Jr.
*Attorney*—F. Shapoe and Alex Mich, Jr.

[57] ABSTRACT

A packing composition effective to reduce the pH of alkaline liquids, used as a pretreatment, in association with a reverse osmosis membrane and support in a liquid treatment system, is made of an encapsulating matrix of polymeric material that is essentially water impermeable at a pH between about 4.5 and 8 and which becomes significantly water permeable at a pH above about 9, and an acidulous material which is encapsulated by the matrix at a pH between about 4.5 and 8, and released progressively from the matrix at a pH above about 9.

11 Claims, 1 Drawing Figure

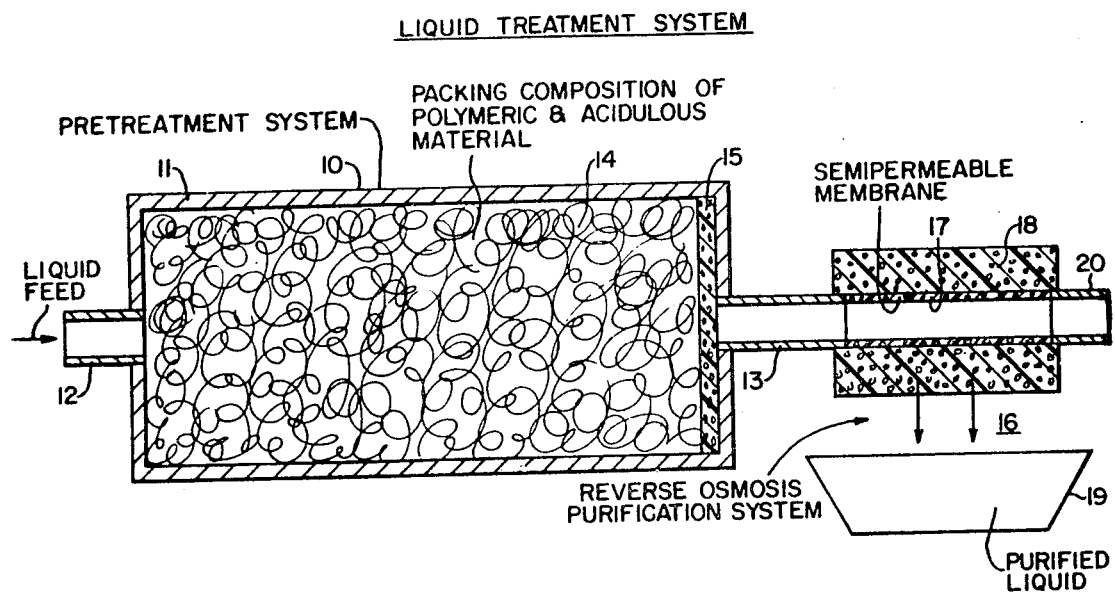

3,737,044

LIQUID TREATMENT SYSTEM FOR HIGH pH WATER

This is a division of application Serial No. 058,788 filed July 28, 1970, now U.S. Pat. No. 3,684.094.

BACKGROUND OF THE INVENTION

Cellulose acetate semipermeable membranes are well known for use in high pressure reverse osmosis fluid purification systems. In present systems, however, the feed water pH must be maintained between about pH 2.5 and pH 9.0. Feed waters outside this pH range will cause degradation of the cellulose acetate reverse osmosis membranes by hydrolysis and failure of the reverse osmosis fluid purification system.

For large commercial systems, acid or base can be added to the feed water to control the pH. However, for home reverse osmosis units this is not practical because of the cost, control, and maintenance problems associated with a chemical feed system. It would be extremely advantageous, therefore, if an inexpensive, simple, pretreatment system could be developed for use in small reverse osmosis modules and reverse osmosis water softener units that must operate on high pH municipal drinking water.

SUMMARY OF THE INVENTION

We have found that pretreating high pH feed water, in a liquid treatment system also containing a reverse osmosis membrane, by first passing the feed through a packing composition containing about 1 to 60 weight percent of an acidulous material distributed through a high pH degradable polymeric material encapsulating matrix that becomes water permeable at a pH above about 9, allowing significant contact of water with the acidulous material, reduced reverse osmosis membrane deterioration problems.

BRIEF DESCRIPTION OF THE DRAWINGS

For a better understanding of the invention, reference may be made to the preferred embodiment, exemplary of the invention, shown in the accompanying drawing. This drawing shows a cross sectional illustration of a liquid treatment system comprising a new and improved liquid pretreatment system, containing the packing composition of this invention, and a reverse osmosis liquid purification system containing a supported semipermeable membrane, with associated means for introducing liquid feed into the pretreatment system, out of the system and into the reverse osmosis system.

DESCRIPTION OF THE PREFERRED EMBODIMENTS

Referring to the drawing, a liquid treatment system is shown. One embodiment of a new and improved high pH liquid pretreatment system is shown as 10. The pretreatment system consists of a container 11, which may be metal, plastic, glass, or other suitable material, with associated liquid feed inlet means 12, outlet means 13 leading to a reverse osmosis purification system, and a pretreatment packing composition 14 held within the container by porous retainer 15. The system 10 can be used to pretreat liquids in association with a reverse osmosis liquid purification system 16, comprising a semipermeable reverse osmosis membrane 17 of either a cellulose ester or cellulose ether derivative, such as for example cellulose acetate, cellulose acetate butyrate, cellulose proprionate or ethyl cellulose, and a porous support 18 for the membrane. The membrane and support allow effusion of purified water into a suitable collecting means 19. The unpurified feed then passes out of the reverse osmosis system by means of outlet 20. The reverse osmosis membrane suitable for use in this system are well known and reference may be made to U.S. Pat. No. 3,133,132 and 3,344,214 for details on their composition and manufacture. The support may be of fibrous filament wound fiberglass having pores therethrough, a plastic or steel tube having holes therethrough or any other suitable porous support. Generally the membrane will be tubular and fit within the walls of the support.

The packing composition 14 comprises an acidulous material uniformly distributed throughout the encapsulating matrix of a high pH degradable polymeric material that is essentially water impermeable at atmospheric pressure. The packing composition must provide ease of flow for the feed, have a large surface area in relation to its weight, provide a consistent concentration gradient of acidulous material and allow progressive release of the acidulous material in high pH liquids. It is preferably employed in the form of long thin fibrous strings or filaments or small drops, beads or granules.

Examples of suitable acidulous materials would include acidulous salts (i.e. a salt that has an acid reaction to litmus or similar indicators in water) such as, for example, magnesium nitrate, magnesium chloride, magnesium sulfate, ammonium nitrate, ammonium chloride, ammonium sulfate, silver nitrate, silver chloride, silver sulfate, lead nitrate, lead chloride, lead sulfate, iron nitrate, iron chloride, iron sulfate, aluminum nitrate, aluminum chloride, aluminum sulfate, and preferably alumina in its variety of forms ($Al_2O_3$; $Al_2O_3 \cdot H_2O$, $Al_2O_3 \cdot 2H_2O$; $Al_2O_3 \cdot 3H_2O$).

These acidulous materials are uniformly distributed through and continuously encapsulated within the matrix of the polymeric chains of a high pH degradable polymeric encapsulating material which forms the main structure of the pretreatment packing composition. By high pH degradable polymeric encapsulating material is meant any polymeric material that is essentially water impermeable or water insoluble, and essentially inert at a pH of between about 4.5 and 8, but degrades and/or dissolves at a significant rate, and becomes significantly water permeable, generally through a hydrolysis reaction, at a pH of greater than about 9. This allows release of the contained acidulous salt and contact of water and the acidulous salt by diffusion at a high pH. The encapsulating material is not one hundred percent water impermeable at a pH of between about 4.5 and 8 but would not allow significant diffusion of acid out of the matrix or significant diffusion of water into the matrix at atmospheric pressure until a pH of about 9 is reached, at which point there would be bulk diffusion of water and acid. The expression pH is employed as an index of acid intensity (an acid solution having a pH less than 7 and a basic solution having a pH greater than 7), and pH being equal to the logarithm of the reciprocal of the hydrogen ion concentration; i.e., pH = log $1/[H^+]$ per liter.

Examples of suitable polymeric encapsulating materials essentially impermeable in water at a pH between about 4.5 and 8 but degradable above a pH of about 9 include cellulose compounds containing chemical groups which are appreciably hydrolyzable in water at a pH of greater than about 9, such as cellulose acetate, cellulose propionate, cellulose butyrate, cellulose acetate-butyrate, cellulose acetate-propionate, methyl cellulose and ethyl cellulose.

When cellulose acetate-alumina is used as the packing composition for the pretreatment of high pH water, the essentially water insoluble and water impermeable cellulose acetate polymeric matrix undergoes hydrolysis in a base environment (cellulose acetate + $OH^-$ → cellulose OH + $acetate^-$). The $OH^-$ from the high pH water significantly degrades and dissolves the cellulose acetate. The alumina heretofore essentially unreacted and trapped along with bound water molecules in the cellulose acetate matrix is freed as the cellulose acetate is hydrolyzed to cellulose. Water is then highly absorbed into the degraded matrix and contacts the freed alumina (which undergoes the reaction $Al_2O_3 + H_2O \rightarrow 2H^+ + 2AlO_2^-$) producing bulk diffusion of an acid ($H^+$), to partially neutralize the high pH feed. The higher the pH of the feed the faster the acid will be released from the encapsulating matrix.

In one method, the packing is made by casting a continuous fibrous filament from a casting solution comprising the cellulose compound, the acidulous salt, a leachable organic pore producing swelling agent such as triethyl phosphate, tetrahydrofurfuryl phosphate or a substantially water soluble liquid amide such as formamide ($HCONH_2$), dimethyl formamide, methyl formamide or ethyl formamide, and a leachable organic solvent such as acetone, methyl ethyl ketone, ethyl alcohol or methyl alcohol. The casting solution is poured into a leaching liquid such as a water or water-organic bath or stream, where the solution is congealed and the encapsulating polymeric matrix of polymer chains is formed, as the organic swelling agent and solvent are leached from the solution forming a thin dense skin of polymeric material on the outside filament surface.

The acidulous salt must be thoroughly mixed with the polymeric material to insure a uniform concentration of the salt throughout the packing when it is placed in the pretreatment system.

The composition of matter constituting the packing could be made by other suitable techniques such as hot melt extrusion of the polymeric material and salt through a shaped opening to give the desired cross section. It could also be cast in flat, thin membrane form by standard casting and leaching techniques.

The acidulous material is generally added to the polymeric encapsulating material in particulate form. The acidulous material particle size can range up to about 297 microns diameter (No. 50 mesh U.S. Sieve Series designation). The preferred particle size range is from about 0.002 micron to 1 micron diameter. The acidulous material must constitute between about 1 to 60 weight percent of the dry packing, based on the weight of acidulous material plus high pH degradable polymeric encapsulating material, with a preferred range between about 30 to 45 weight percent acidulous material. Below 1 weight percent, the pH will not be effectively reduced. Above 60 weight percent, acidulous material, the pretreatment packing will tend to crumble.

EXAMPLE 1

A casting solution was prepared containing 16 ounces of cellulose acetate, 6 ounces of alumina having an average particle size of 0.03 microns, 47 ounces of acetone and 31 ounces of formamide.

The solution was ball milled for three hours and cast into a continuous, fibrous packing filament by slowly pouring the casting solution into a stream of cold water. This procedure provided a short air contact time for the casting solution and resulted in the water stream shearing the stream of casting solution, congealing it to a more viscous form and leaching out the acetone and formamide at the same time, to provide a very thin packing filament that was caught on a sieve.

The packing had a large surface area to weight ratio, a cellulose acetate polymeric matrix encapsulating the interdispersed alumina acidulous material, and a thin cellulose acetate skin that was very dense as compared to the rest of the structure. These packing fibers were from about 10 to 40 mils (0.01 – 0.04 inch) in diameter.

A two foot long 1¼ inch I.D. steel pipe was packed with 3 ounces of the dried cellulose acetate-alumina packing filament and capped at both ends except for an inlet and outlet tube, to form a pretreatment system. Water containing about 200 ppm impurities was fed through the pipe containing the pretreatment packing composition at a rate of 30 milliliters per minute. The pH of the water entering and leaving the pretreatment system was measured for a variety of feed pH's. The results are shown in Table 1.

TABLE 1

| pH of Water Going Into Pretreatment System | pH of Water Coming Out of Pretreatment System |
| --- | --- |
| 8.1 | 7.7 |
| 9.0 | 8.2 |
| 10.0 | 8.5 |
| 10.7 | 8.7 |

The pretreatment system lowered the pH of the feed water to a safe level (pH below 9) at the high pH but did not lower it to the acid region (pH below about 4.5 will also start to cause membrane deterioration) for the lower pH feed.

As can be seen the packing is self-metering and progressively releases acid. At an initial pH of 10.7 the reduction was 2 pH units, whereas at an initial pH of 8.1 the reduction was only 0.4 pH units, due to the fact that the polymeric encapsulant will not degrade as fast at lower pH values and less acidulous salt will be freed to effect neutralization. Other advantages of the pretreatment system are its low cost and ease of insertion into or removal from a liquid treatment system.

This pretreatment system was also operated for four weeks in a fluid treatment system also containing a supported cellulose acetate reverse osmosis membrane in a home water treatment module. The module produced about 2.2 gallons per day drinking water from a 10 gallon per day feed containing about 200 ppm impurities. The pH of the feed going into the pretreatment system was 10 and the pH of the feed coming out of the pretreatment system and into the reverse osmosis fluid purification system was 8.5 During the four weeks of operation, the cellulose acetate reverse osmosis membrane in the module showed no sign of degradation due to hydrolysis.

We claim as our invention:

1. A packing composition effective to reduce the pH of alkaline liquids comprising an encapsulating matrix of polymeric material and an acidulous material distributed therethrough said matrix capable of encapsulating the acidulous material at a pH between about 4.5 and 8 and progressively releasing the acidulous material at a pH above about 9.

2. A packing composition effective to reduce the pH of alkaline liquids comprising:
   a. a matrix of polymeric material that is essentially water impermeable at a pH between about 4.5 and 8 and which becomes substantially water permeable at a pH above about 9, and
   b. an acidulous material distributed throughout and encapsulated by the matrix.

3. The composition of claim 2 wherein the acidulous material is uniformly distributed throughout the matrix and constitutes from about 1 to 60 weight percent of the packing composition.

4. The composition of claim 3 wherein the acidulous material is selected from the group consisting of alumina, magnesium nitrate, magnesium chloride, magnesium sulfate, ammonium nitrate, ammonium chloride, ammonium sulfate, silver nitrate, silver chloride, silver sulfate, lead nitrate, lead chloride, lead sulfate, iron nitrate, iron chloride, iron sulfate, aluminum nitrate, aluminum chloride and aluminum sulfate.

5. The composition of claim 3 wherein the polymeric material constituting the matrix comprises a cellulose compound containing a chemical group which is appreciably hydrolyzable in water at a pH greater than about 9.

6. The composition of claim 5 wherein the polymeric material constituting the matrix is selected from the group consisting of cellulose acetate, cellulose propionate, cellulose butyrate, cellulose acetate-butyrate, cellulose acetate-propionate, methyl cellulose and ethyl cellulose.

7. The composition of claim 5 wherein the acidulous material is alumina and the polymeric material constituting the matrix is cellulose acetate.

8. A method of making a packing composition useful in reducing the pH of alkaline liquids comprising (1) admixing a liquid comprising a polymeric material that is essentially water impermeable at a pH between about 4.5 and 8 and which becomes substantially water permeable at a pH above about 9, and 1 to 60 weight percent of a particulate acidulous material and (2) congealing said liquid admixture to form a polymeric matrix encapsulating said acidulous material.

9. The method of claim 8 wherein the admixture is a hot liquid, said hot liquid being extruded through a shaped opening, and thereafter congealed by cooling.

10. The method of claim 8 wherein the admixture also contains a leachable solvent, a leachable swelling agent and the admixture is congealed by leaching the admixture to form a matrix of polymeric material with acidulous material distributed throughout and encapsulated by the matrix.

11. The method of claim 10 wherein the acidulous material is alumina having a particle size range from about 0.002 to 297 microns and the polymeric material is selected from the group consisting of cellulose acetate, cellulose propionate, cellulose butyrate, cellulose acetate-butyrate, cellulose acetate-propionate, methyl cellulose and ethyl cellulose.

* * * * *